Figure 1:
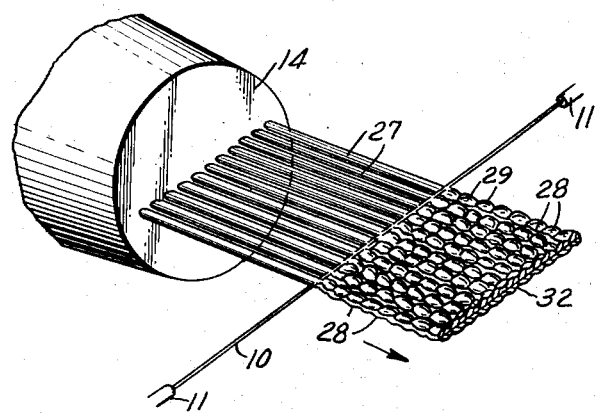

Jan. 8, 1952                J. VEIT              2,581,614
APPARATUS FOR THE MANUFACTURE OF PATTERNED
THERMOPLASTIC STRIP MATERIAL
Filed May 27, 1948

Inventor
JULIUS VEIT
By Raymond Richardson
Henry E David
Attorneys

Patented Jan. 8, 1952

2,581,614

UNITED STATES PATENT OFFICE 2,581,614

APPARATUS FOR THE MANUFACTURE OF PATTERNED THERMOPLASTIC STRIP MATERIAL

Julius Veit, Hounslow West, England; Gertrud Veit, executrix of said Julius Veit, deceased, assignor to Duratube & Wire Limited, Feltham, England Application May 27, 1948, Serial No. 29,545
In Great Britain October 9, 1947

3 Claims. (Cl. 18—12)

This invention relates to the manufacture of patterned thermoplastic strip material.

In the known method of manufacturing patterned thermoplastic strip material, a roller having a pattern on its periphery is so positioned with respect to the extrusion die for the thermoplastic strip material that the extruded material will, while still hot and soft, travel over the patterned periphery of the roller which is thus rotated and embosses the strip material with its pattern. The object of the invention is to provide apparatus (without an embossing roller) for manufacturing thermoplastic strip material patterned with longitudinal rows of protuberances.

Apparatus according to the invention comprises an extrusion die with an horizontal row of separate extrusion orifices and a straight obstructing element, longer than the length of said row of orifices, arranged horizontally in front of, parallel to and spaced from said row of orifices, the distance of said obstructing element from said row of orifices being such that said obstructing element will obstruct the normal free flow of the cords of thermoplastic material from said orifices while said thermoplastic material is still in the hot and soft condition and said orifices being so close together that, when said cords are in contact with said obstructing element, their lateral edges coalesce.

In a preferred embodiment of the invention, the obstructing element is of linear form and thinner than the width of any of the orifices and is arranged to lie in a plane that passes medially through said orifices. The upper and lower parts into which the cords of thermoplastic material are divided by this obstructing element come into contact with one another and re-unite while still hot and soft immediately after passing beyond the obstructing element.

The method of employing the invention comprises extruding hot and soft thermoplastic strip-forming material through the extrusion die of an extrusion machine, there being arranged, in front of said extrusion die and in such a position as to be in contact with and across the whole width occupied by said thermoplastic strip-forming material while said strip-forming material is still in the hot and soft condition after issuing from said extrusion die, a fixed, non-rotating obstructing element which, while being adapted to obstruct the normal free flow of said strip-forming material, cannot entirely interrupt said flow, the vibration of said strip-forming material producing a pattern by the interaction of said strip-forming material with said obstructing element.

Preferably, the obstructing element is in the form of a wire or of a thin metallic rod or bar fixedly mounted at one end or, preferably, at both ends thereof.

Figure 2:
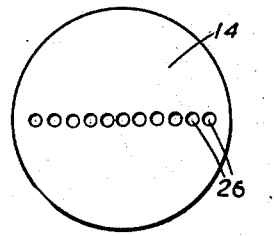

The invention is illustrated by way of example by the accompanying drawings, of which Fig. 1 shows, in perspective, apparatus according to the invention with thermoplastic material being patterned thereby, and Fig. 2 is a front elevation of the extrusion die.

In the example represented in Figs. 1 and 2 the thermoplastic material is extruded from the extruding machine through a row of separate extrusion orifices 26, which are near one another, in the form of cords 27 and the wire 10 is arranged so that the parts thereof that are in contact with the hot and plastic material of the cords lie entirely within the latter. The wire 10 will obstruct the normal free flow of the thermoplastic material of the cords 27 and it will cause the production of protuberances 28 on the opposite sides of the cords. It will also divide each of the cords 27 into two parts which will come into contact with each other and adhere together while still hot and soft immediately after passing beyond the wire 10. In addition, the wire 10 will cause the hot and plastic material of the cord parts in contact therewith to spread laterally, so that the side parts of adjacent cords become united with one another by webs 29 which will also come into contact with one another while still hot and soft immediately after passing beyond the wire 10, a strip patterned on both sides being formed.

The strip material patterned as hereinbefore described may be passed, in the usual manner, over a guide roller on to a revolving drum on which it is wound.

Strip material patterned on both faces as hereinbefore described can readily be divided into two strips each having a patterned face. It has been found that, although the parts which adhere together immediately after passing beyond the wire 10 do so quite firmly, they can be separated from each other by being torn apart. On examining a transverse edge of this strip material a faint line of demarcation 32 between the two parts will be observed. After making a sufficiently deep incision along this line to enable the two parts to be grasped between the fingers, they can be readily torn apart.

What I claim is:

1. Apparatus for manufacturing thermoplastic strip material patterned with longitudinal rows of protuberances, comprising an extrusion die with an horizontal row of separate extrusion orifices and a straight obstructing element, longer than the length of said row of orifices, arranged horizontally in front of, parallel to and spaced from said row of orifices, the distance of said obstructing element from said row of orifices being such that said obstructing element will obstruct the normal free flow of the cords of thermoplastic material from said orifices while said thermoplastic material is still in the hot and soft condition and said orifices being so close together that, when said cords are in contact with said obstructing element, their lateral edges coalesce.

2. Apparatus for manufacturing thermoplastic strip material patterned on both sides with longitudinal rows of protuberances, comprising an extrusion die with an horizontal row of separate extrusion orifices and an obstructing element of linear form longer than the length of said row of orifices, thinner than the width of any of said orifices and arranged horizontally in front of, parallel to and spaced from said row of orifices, and in a plane passing medially through said orifices, the distance of said obstructing element from said row of orifices being such that said obstructing element will obstruct the normal free flow of the cords of thermoplastic material from said orifices while said thermoplastic is still in the hot and soft condition and said orifices being so close together that, when said cords are in contact with said obstructing element, their lateral edges coalesce.

3. Apparatus according to claim 2, wherein the obstructing element is a fixedly mounted wire.

JULIUS VEIT.

REFERENCES CITED

The following references are of record in the file of this patent:

UNITED STATES PATENTS

| Number | Name | Date |
|---|---|---|
| 1,318,292 | Laskey | Oct. 7, 1919 |
| 2,367,310 | Pease | Jan. 16, 1945 |
| 2,408,627 | Green | Oct. 1, 1946 |
| 2,434,533 | Wurzberger | Jan. 13, 1948 |